P. M. BEARD.
SAFETY CHAIN HOOK.
APPLICATION FILED AUG. 4, 1911.
1,047,488.
Patented Dec. 17, 1912.
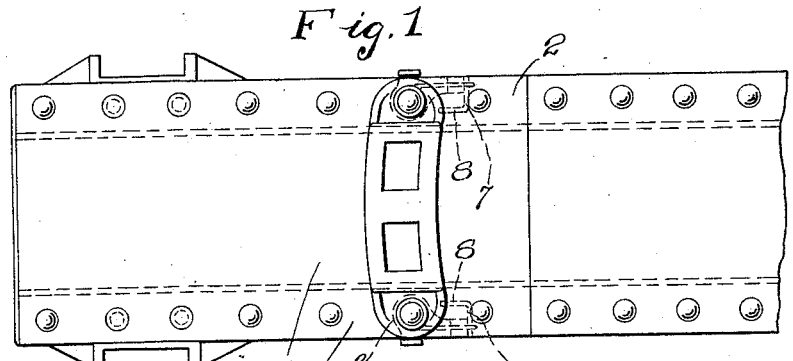
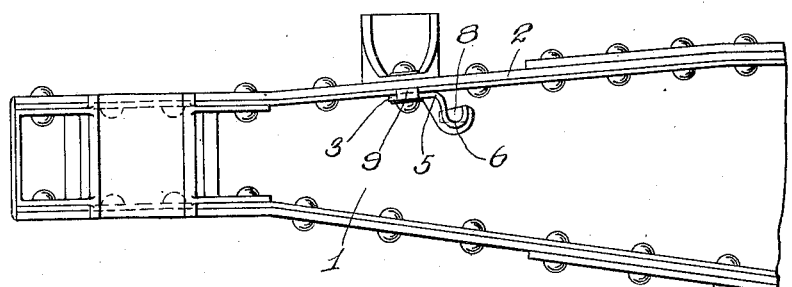
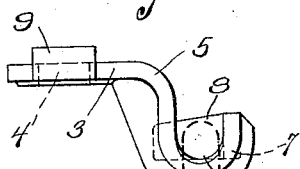
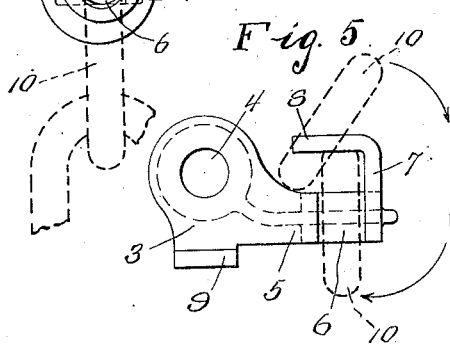
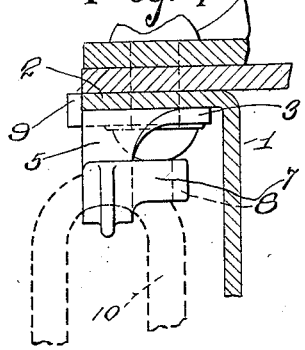
WITNESSES
INVENTOR
Paul M. Beard
BY
F. H. Gibbs
ATTORNEY

UNITED STATES PATENT OFFICE.

PAUL M. BEARD, OF ST. LOUIS, MISSOURI, ASSIGNOR TO AMERICAN CAR AND FOUNDRY COMPANY, OF ST. LOUIS, MISSOURI, A CORPORATION OF NEW JERSEY.

SAFETY-CHAIN HOOK.

1,047,488. Specification of Letters Patent. Patented Dec. 17, 1912.

Application filed August 4, 1911. Serial No. 642,395.

*To all whom it may concern:*

Be it known that I, PAUL M. BEARD, residing at St. Louis, Missouri, and being a citizen of the United States, have invented certain new and useful Improvements in Safety-Chain Hooks, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof will occur to persons skilled in the art.

In said drawings: Figure 1 is a top plan view of a portion of a truck bolster illustrating, by dotted lines, the safety chain hook applied thereto. Fig. 2 is a side elevational view of the bolster shown in Fig. 1, one of the safety chain hooks being seen in elevation. Fig. 3 is an enlarged detail side elevational view of the safety chain hook detached. Fig. 4 is an enlarged end elevational view of the safety chain hook illustrating its connection with contiguous parts of the bolster structure, and Fig. 5 is an enlarged top plan view of the safety chain hook detached. Fig. 5 also illustrates, by heavy dotted lines, the manner of attaching or detaching the safety chain and Figs. 3 and 4 show the relative position of the chain when at rest in the pocket of the hook.

The object of this invention is to provide a safety chain hook applicable to car bolsters of simple construction and inexpensive to manufacture and apply, which will render possible the convenient attachment or detachment of the safety chain without necessitating disturbance of rivet connections.

A further object is to effectually avoid all possibility of accidental detachment of the chain from the pocket of the hook.

Heretofore it has been customary to attach a laterally projecting eye to the side of the bolster, said eye being adapted to receive the safety chain and being usually connected to the bolster by one of the rivets which secure the side bearing in place. With this old construction, it was necessary to remove the rivet before the chain could be detached from the bolster.

Referring to the drawings, in which like letters of reference indicate corresponding parts throughout the several views, the numeral 1 indicates the bolster, which may be of any desirable construction which provides the outstanding flanges 2—2 at opposite sides thereof, adapted for attachment of the safety chain hook.

The chain hooks at opposite sides of the bolster, and at the opposite ends thereof, being identical, one end only of the bolster is illustrated, and one only of the safety chain hooks and its connection with the bolster will be described in detail as follows:

The body portion as 3 is formed with an aperture 4, adapted to receive one of the rivets extending through the flange of the bolster said rivet being one adapted for fixing the side bearing in place or not as may be desired. The body portion 3 is adapted to rest with its upper surface against the under surface of the bolster flange and a lateral extension 5 is formed thereon, extending a short distance longitudinally beneath said flange and depending from the body portion 3 and having its lower end turned upward so as to form a pocket as 6 in which the safety chain is adapted to rest.

Projecting laterally, toward the longitudinal median line of the bolster, from the upturned end portion of the extension 5, is a finger 7, the inner end of which is turned at right angles as at 8 and laps a portion of the extension 5, adjacent the pocket 6, in such manner as to provide a tortuous passage to said pocket.

The face edge of the extension 5 extends parallel with the edge of the bolster and an upturned lug 9 is formed upon the body portion 3 adapted to lap the adjacent vertical edge portion of the bolster flange in such manner as to prevent swiveling of the hook about its rivet connection with the bolster.

In order to attach the chain link as 10, said link is first introduced over the extreme end of the portion 8 of the finger 7 and is then moved, as indicated by the heavy dotted lines and the arrows on Fig. 5, along the finger 7 and finally dropped into position at rest in the hollow of the pocket 6.

It will be noted that in order to detach the chain, it is necessary, not only to lift the attaching link thereof so as to bring it above the upper surface of the finger 7, but it is also necessary to give the chain approximately a half turn before it can be detached from the end of the portion 8 of said finger, a movement which is practically impossible through accident.

It will also be noted, particularly in Fig. 4, that the portion 8 of the finger 7 is sufficiently close to the adjacent face of the extension 5 so that it extends over a portion of the chain link and prevents direct lifting of said link.

What I claim is:

1. A safety chain hook adapted for attachment to a car bolster comprising a pocket, and being formed with means in the form of an L-plate adapted to provide a tortuous passage to said pocket.

2. A safety chain hook adapted for attachment to a car bolster comprising a pocket, and being formed with a laterally projecting finger lapping one side of said pocket adapted to provide a tortuous passage to said pocket said hook having an integral reinforcing member adapted to resist strains on said finger.

3. The combination with a truck bolster, of a safety chain hook supported upon said bolster by a single rivet, and means formed upon said chain hook engaging a surface of said bolster adapted to prevent movement of said chain hook about said support.

4. The combination with a truck bolster comprising an outstanding flange, of a safety chain hook comprising a body portion fixed to said flange, an extension formed upon said body portion being formed with a chain pocket, and means engaging the edge of said flange adapted to retain said chain hook in fixed position.

5. The combination with a truck bolster and a safety chain, of a chain hook adapted for attachment to said bolster and carried by said bolster, a pocket comprised in said hook adapted to receive said chain, and a laterally projecting finger formed on said hook, lapping one side of said pocket, adapted to partially rotate said chain when entering said pocket.

6. The combination with a truck bolster and a safety chain, of a chain hook carried by said bolster, a pocket comprised in said hook adapted to receive said chain, and a laterally projecting finger formed on said hook lapping one side of said pocket and having a part extending above an upper surface portion of said chain when said chain is in said pocket for preventing direct lifting of said chain from said pocket.

7. The combination with a truck bolster and a safety chain, of a chain hook carried by said bolster, a pocket comprised in said hook adapted to receive said chain, and a laterally projecting finger formed on said hook lapping one side of said pocket and having a part extending above an upper surface portion of said chain when said chain is in said pocket for preventing direct lifting of said chain from said pocket and for providing a tortuous passage to said pocket.

8. A safety chain hook adapted to be attached to a car bolster by a single rivet and provided with a vertical extension adapted to rest parallel with one edge of said bolster.

9. A safety chain hook adapted to be attached to a car bolster by a single rivet and provided with a vertical extension adapted to contact with said bolster to prevent rotation in one direction.

10. The combination of a truck bolster comprising an outstanding horizontal flange, of a safety chain hook fastened to the underside of said flange, and having its pocket facing upwardly and in juxtaposition to said flange, thereby to assist in preventing the safety chain from accidentally unseating itself from said pocket.

11. A safety chain hook comprising a pocket forming member, said member having a laterally projecting finger co-extensive with the depth of said pocket and lapping parts of said hook.

12. A hook having a body portion, members forming two vertical pockets one of said pockets disposed to one side of said body portion, said pockets extending at right angles to and communicating with each other.

13. A safety chain hook comprising two parallel spaced apart members, one of said members including a right angled extension projecting toward the other member and a pocket forming member connecting said spaced apart members at the end remote from the extension.

In witness whereof I have hereunto set my hand in the presence of two witnesses.

PAUL M. BEARD.

Witnesses:
JAMES J. COOPER,
OSCAR HOCHBERG.

Copies of this patent may be obtained for five cents each, by addressing the "Commissioner of Patents, Washington, D. C."